United States Patent [19]

Henneberg et al.

[11] Patent Number: 4,729,159
[45] Date of Patent: Mar. 8, 1988

[54] TOOL EXCHANGE DEVICE

[75] Inventors: Hasso Henneberg, Hanover; Joachim Kuska, Wunstorf; Wolfgang Schaefer, Langenhagen, all of Fed. Rep. of Germany

[73] Assignee: Gildemeister Aktiengesellschaft, Bielefeld, Fed. Rep. of Germany

[21] Appl. No.: 906,922

[22] Filed: Sep. 11, 1986

[30] Foreign Application Priority Data

Sep. 14, 1985 [DE] Fed. Rep. of Germany ....... 3532924

[51] Int. Cl.⁴ ............................................. B23Q 3/155
[52] U.S. Cl. ...................................... 29/568; 82/36 A; 279/1 TS
[58] Field of Search .................... 29/568; 82/2.5, 2.7, 82/36 A; 279/1 TS

[56] References Cited

U.S. PATENT DOCUMENTS

| | | | |
|---|---|---|---|
| 3,423,812 | 1/1969 | Spur | 29/36 X |
| 3,845,546 | 11/1974 | Rutschke | 279/1 TS X |
| 4,528,742 | 7/1985 | Peacock | 29/568 |
| 4,571,796 | 2/1986 | Sellner et al. | 29/568 X |
| 4,577,389 | 3/1986 | Shultz | 29/568 |
| 4,597,144 | 7/1986 | Frank et al. | 29/40 |
| 4,611,383 | 9/1986 | Sonnek | 82/36 A X |

FOREIGN PATENT DOCUMENTS

| | | | |
|---|---|---|---|
| 7506833 | 12/1975 | Netherlands | 82/36 A |
| 2075893 | 11/1981 | United Kingdom | 29/568 |
| 1074700 | 2/1984 | U.S.S.R. | 29/568 |

Primary Examiner—Gil Weidenfeld
Assistant Examiner—Steven C. Bishop
Attorney, Agent, or Firm—Michael J. Striker

[57] ABSTRACT

In a machine tool with an inclined machine bed in which two independently movable cross slides are provided, which carry turret heads with tool receivers automatically interchangeable tool grippers are adapted to bring the tools in predetermined positions into respective tool receivers.

5 Claims, 6 Drawing Figures

TOOL EXCHANGE DEVICE

BACKGROUND OF THE INVENTION

The present invention relates to a device for interchanging tools in the tool receivers of two cross slides of the machine tool turrets, which slides are movable independently from each other in two planes inclined to the horizontal. The tool receivers in the machine tools of the foregoing type extend parallel to the workpiece spindle axis of the machine tool.

The machine tool of the type under consideration is normally provided with a workpiece handling device, the workpiece gripper of which is movable in the vertical plane parallel to the workpiece spindle axis.

A tool interchange device disclosed in DE-OS No. 31 18 594 serves the purpose of interchanging tools in the tool turret heads of the machine tool. The tool exchange device also employs a workpiece exchange device which includes a transport carriage movable in the direction of elongation of the machine tool, a carriage movable perpendicular to the transport carriage and a gripper provided on the second carriage. The gripper which is provided for the workpiece handling can be additionally equipped with gripper pairs for the tool exchange. The handling device has the advantage that it must be movable only in two directions.

The above publication discloses the tool exchange device in only one turret head. It is however desirable to provide in the machine tool with two tool holders, a tool interchange at both tool holders in the same fashion, that is without increasing expenses.

SUMMARY OF THE INVENTION

It is an object of the present invention to provide a tool exchange device in which the disadvantages of the conventional tool exchange devices would be avoided.

It is a further object of the present invention to enable a tool exchange for a machine tool with two tool turret heads arranged on the carriages movable independently from each other in a plane inclined to the horizontal.

Yet another object of the invention is to make possible a tool exchange with a handling device which can be moved only along one horizontal axis and one vertical axis.

These and other objects of the invention are attained by a device for interchanging tools in tool receivers of two tool turret heads arranged on two cross slides independently movable from each other in a plane inclined to the horizontal in a machine tool, said tool receivers extending parallel to a workpiece spindle axis of the machine tool which also includes a workpiece handling device with a workpiece gripper movable in a vertical plane parallel to the workpiece spindle axis, the device comprising tool grippers interchangeably insertable in the workpiece handling device, said cross slides each including a plan carriage, at least one tool receiver of each tool turret head being movable in a plane of movement of said tool grippers by a respective plan carriage at a respective cross slide; and means for moving tools being interchanged to a preparation position for said grippers which place the tools into said tool receivers to be clamped in a respective cutting position.

The problem to be overcome resides in that with the tool holders arranged in the plane inclined to the vertical, the tool exchange positions of the corresponding tool receivers in the tool turret heads cannot be obtained by the handling device. The tool receivers with the same switch angle of the turret head should be moved in a common exchange plane, this is impossible due to a considerably long movement path and could lead to a collision of the tool holders.

The safety of the tool transport and tool interchange is enhanced when the tools or tool holders have the elements which ensure a non-changeable position of the tool or tool holder. Such an element can be formed by flat clamping faces on the tool holder. The same tools can be employed for loading of both tool turret heads when each tool gripper has gripping fingers which have gripping surfaces, said gripping surfaces of each tool holder of the tool being interchanged having clamping faces corresponding to said gripping surfaces, two of said clamping faces being offset relative to each other by 90°.

The tool or tool holder may have a tilt-stable position when each tool gripper has two clamping fingers each having V-shaped gripping surfaces, wherein one of said gripping surfaces is linear and the other of said gripping surfaces is curved.

The danger of collision during the insertion of the tool holders into the tool receivers, particularly in the upper turret head, is reduced by the structure wherein one of said clamping fingers is stationary and the other of said clamping fingers is displaceable, wherein the linear gripping surface is provided on said stationary gripping finger and is inclined to a vertical at a small angle. This substantially reduces friction forces during the clamping of the tools.

In order to ensure an automatic course of the tool interchange the means for moving tools being interchanged to a preparation position may include a tool magazine in which one of said tools is arranged in a first cutting position and the other of said tools is arranged in a second cutting position. Thereby each tool being interchanged is stored in the magazine in the position in which it should be inserted into a respective turret head.

Furthermore, one tool magazine for a preparation position may be provided for receiving a tool being interchanged in a first cutting position for a tool exchange in a first tool turret head, and a second tool magazine may be provided for receiving a tool being interchanged in a second cutting position for a tool change in a second tool turret head. Thus two magazines in two regions are provided. A corresponding tool storing device or magazine is thereby provided for each turret head so that an entire number of tools being interchanged can be increased. In each case, as many tools can be stored in the magazine as can be received in two turret heads.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
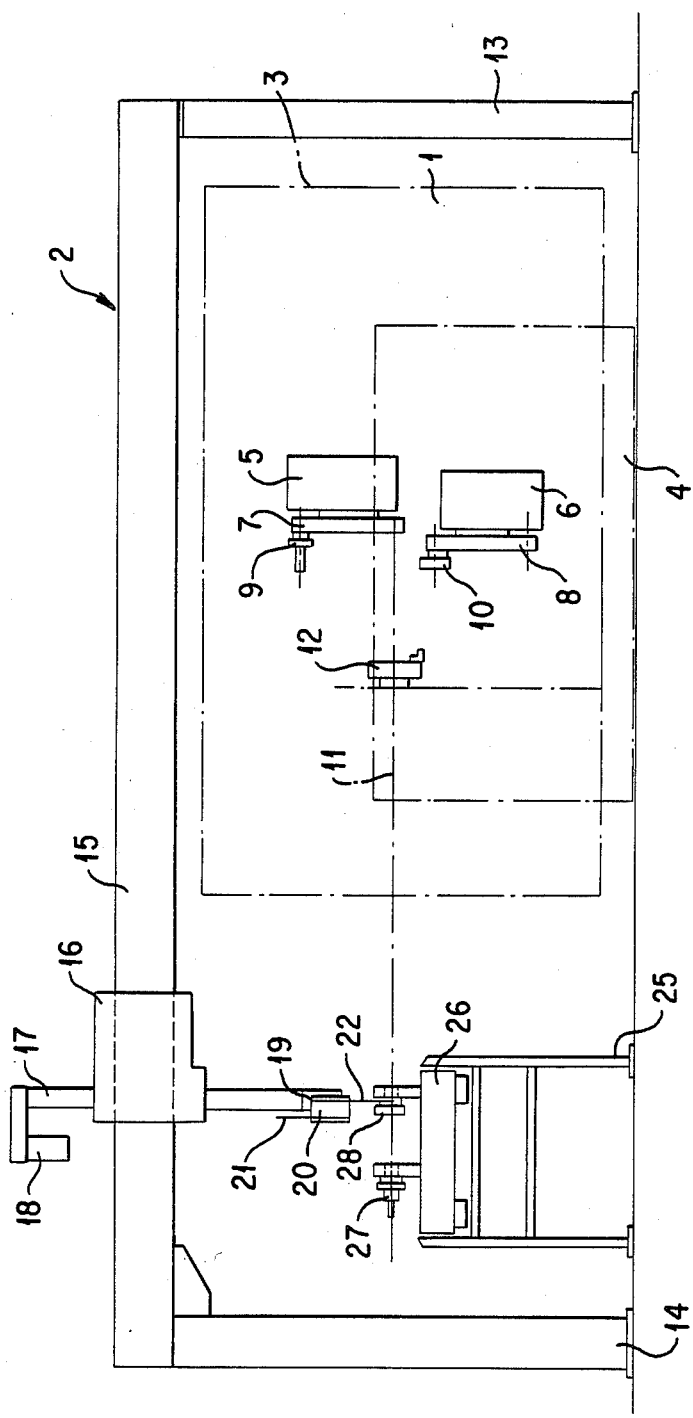
FIG. 1 is a top plan view of the tool exchange device according to the invention.
Figure 1A:
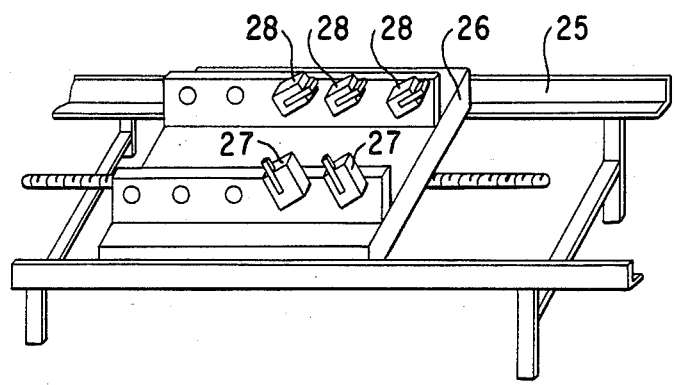
FIG. 1a is a perspective view showing inclined tools.
Figure 1B:
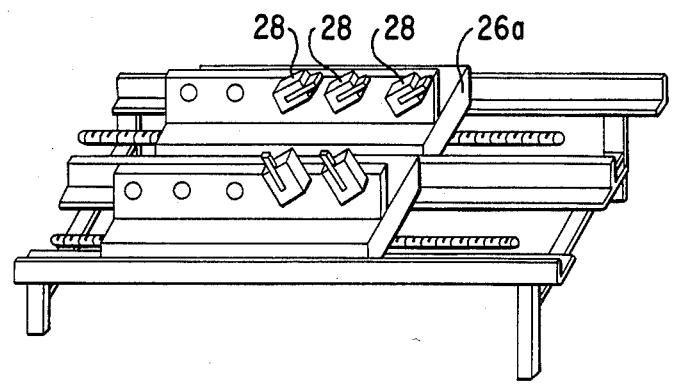
FIG. 1b is a perspective view also showing inclined tools.

Referring now to the drawings in detail, FIG. 1 illustrates a machine tool 1 which overlaps a workpiece handling device 2. A machine tool or cover 3 covers the machine tool. Reference numeral 4 designates a machine tool frame shown by dash-dotted line as well as hood 3.

The machine frame 4 supports on an inclined bed 29 (FIG. 2), two turret heads 5, 6 with turret discs 7, 8 in which tools 9, 10 are received. The turret discs have parallel axes which are also parallel to a workpiece spindle axis 11. A chuck 12 for receiving a workpiece being treated is secured in a non-illustrated workpiece spindle.

The workpiece handling device 2 is comprised of a transverse bars 15 which rest on supports 13, 14. A carriage 16 is movably supported on the transverse bar 15. Carriage 16 is displaceable in the direction of the workpiece spindle axis 11. Two guide tubes 17 are supported in the carriage 16. These guide tubes can be vertically displaced by means of a drive motor 18. The guide tubes 17 merge at their lower ends into a supporting arm 19, on which a gripper holder 20 is rotationally positioned. A double gripper with two tool grippers 21, 22 arranged at two opposite sides of the gripper holder 20 are provided in this device. The tool grippers 21, 22 are releasably—secured to the gripper holder and can be automatically interchanged relative to the workpiece gripper or the gripper supporting the clamping jaws.

At the side of the spindle box, near the machine tool 1, is positioned, in the region of the moving range of the supporting arm 19, a workpiece pallet gripper transport system 25, which selectively moves with workpieces or a pallet 26 carrying tools 27, 28 below arm 19 in a stepwise fashion so that the workpieces or tools 27, 28 can be held by the gripper on the supporting arm 19.

Figure 2:
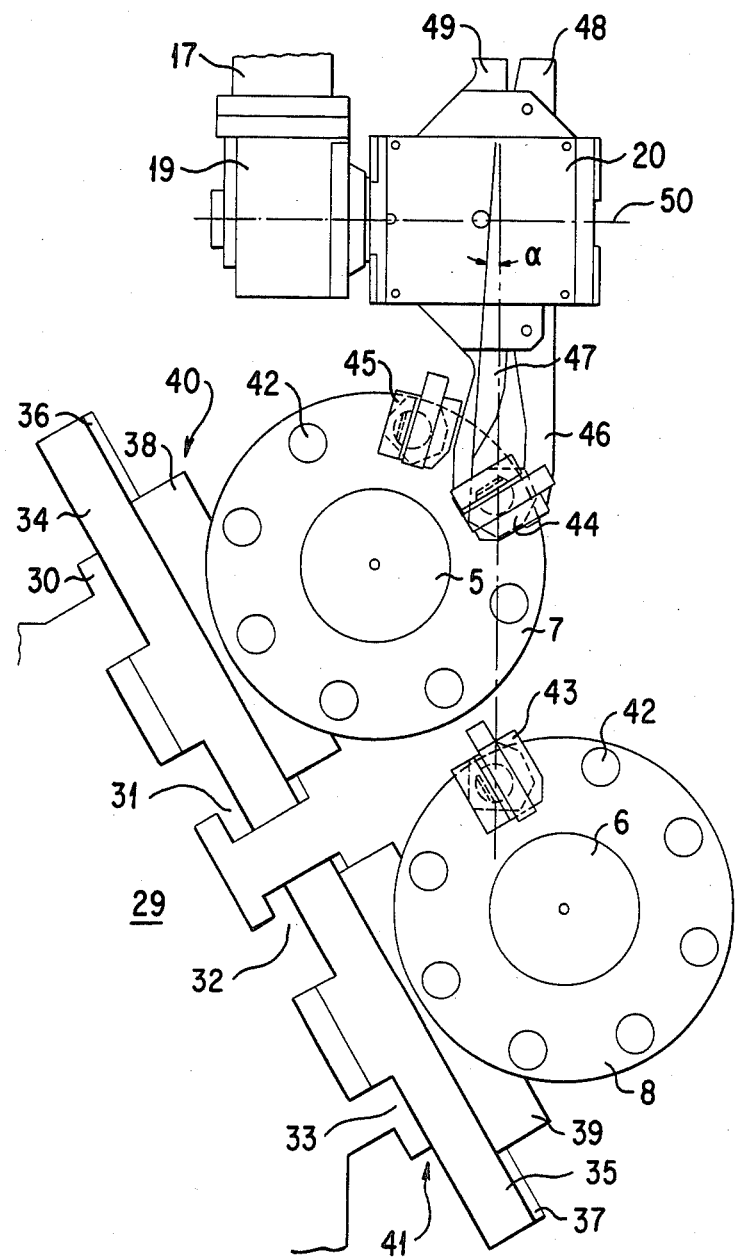
FIG. 2 is a front view of the turret head with a tool gripper.

FIG. 2 shows the machine tool 1 in the direction as seen from the workpiece spindle to the tool turret heads 5, 6. The machine tool bed 29 carries four guide tracks 30, 31, 32, 33 on which bed carriages 34, 35 are movably supported in the direction of the spindle axis 11. The bed carriages 34, 35 support at their sides guide tracks 36, 37 on which plan carriages 38, 39 can be displaced perpendicular to the direction of movement of bed carriages 34, 35.

Plan carriage 38 and bed carriage 34 form a cross slide 40 which carries the upper tool turret head 5 whereas a lower cross slide, formed by the plan carriage 39 and bed carriage 35, carries the lower tool turret head 6.

Turret discs 7, 8 are rotationally mounted on the tool turret heads 5, 6. These turret discs have tool receivers 42 in the form of bores extending parallel to the axes of tool turret heads 5, 6. Any suitable tool holders, for example standardized tool holders 43, 44, 45 each provided with a cylindrical toothed tool holder shaft can be inserted in tool receivers 42. The tool holders are therefore provided with similar clamping surfaces at which they can be non-rotationally held by clamping fingers 46, 47 or 48, 49. The clamping fingers 46, 47 and 48, 49 belong to the tool grippers 21, 22 which are pivotable about a horizontal switch axis 50 relative to the supporting arm 19. Tool grippers 21, 22 are releasably connected to the gripper holder 20. The machine tool side clamping fingers 47, 49 are immovable relative to the tool grippers 21, 22 whereas the opposing clamping fingers 46, 48 perform the clamping movement as a pivoting movement.

Inasmuch as the workpiece handling device 2 can move linearly only along two axes, namely in the direction normal to the plane of drawing in FIG. 2 and in the direction of the guide tube 17 for the tool exchange, the centers of the tool holders 44, clamped in the tool grippers 21, 22, must lie in the same plane as certain tool receivers 42 for taking over the tools of the turret discs 7, 8.

FIG. 2 clearly shows that the tools assigned to these tool receivers have different cutting positions. The insertion of the tools into the tool receiving bores 42 of the both turret discs 7, 8 with the same cutting position is not possible because the plan carriages 38, 39 can not be brought to the same exchange position, to avoid collision. Such a tool exchange could be possible only with a flat portal, the installation of which would be considerably expensive.

Figure 3:
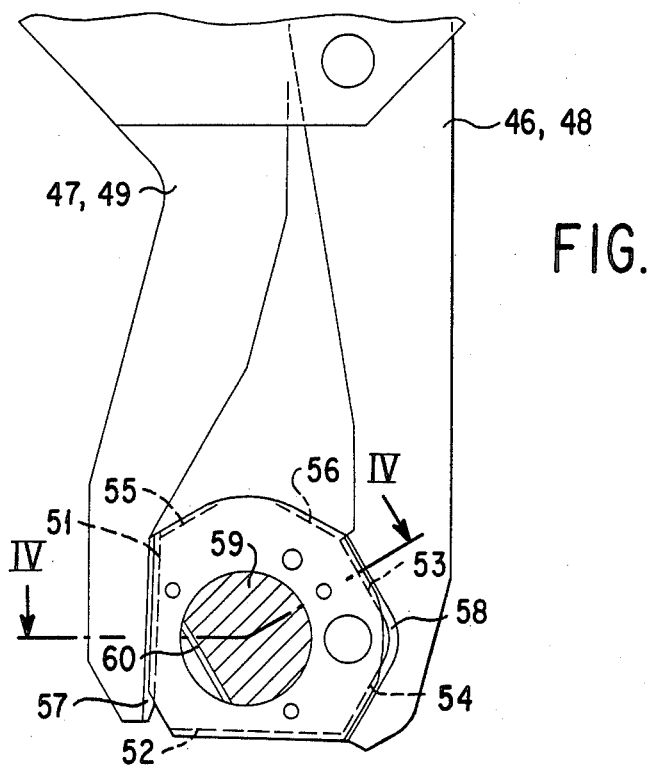
FIG. 3 is a front view of the tool gripper, on an enlarged scale.

FIG. 3 illustrates the aforementioned clamping surfaces of the tool holders 43, 44, 45 in greater detail. These clamping surfaces are formed by two longer linearly extending V-shaped grooves 51, 52 which are offset by 90° relative to each other, and respective two opposite shorter V-shaped grooves 53, 54 or 55, 56 which are positioned at an angle to each other. V-shaped webs 57, 58 of the clamping fingers 46, 47 or 48, 49 are engaged in the V-shaped grooves 51-56. The section through the tool holder shaft 59 shows a toothing 60 for clamping provided in the tool turret discs 7, 8. This toothing determines an angular position relative to the tool turret discs 7, 8. Since the left-hand clamping fingers 47, 49 are not pivoted away the web 57 is positioned at an angle to the vertical.

Figure 4:
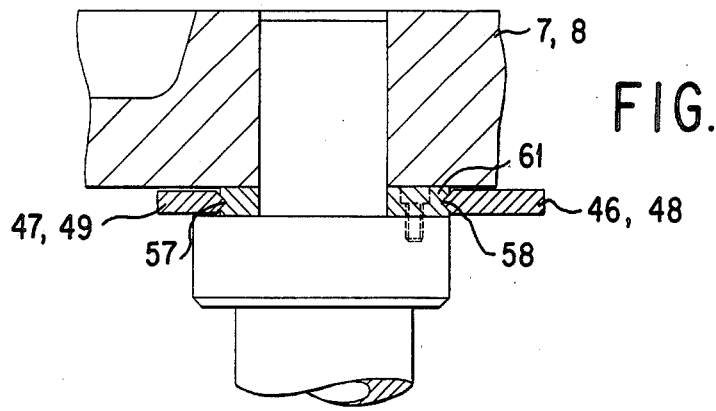
FIG. 4 is a sectional view along line IV—IV of FIG. 3.

In the sectional view of FIG. 4, the V-shaped webs or cross-pieces 57, 58 of the clamping fingers 46, 47, 48, 49 are clearly shown. The respective V-shaped grooves 51, 53 are positioned in an adapter plate 61 which is screwed to the respective tool holder 43, 44, 45. The tool holder shaft 59 is situated in the tool receiver 42 of the respective turret disc 7, 8.

It will be understood that each of the elements described above, or two or more together, may also find a useful application in other types of tool exchange devices differing from the types described above.

While the invention has been illustrated and described as embodied in a tool exchange device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly consititute essential characteristics of the generic or specific aspects of this invention.

What is claimed as new and desired to be protected by Letters Patent is set forth in the appended claims:

1. A device for interchanging tools in tool receivers of two tool turrent heads arranged on two cross slides independently movable from each other in a plane inclined to the horizontal in a machine tool, said tool receivers (42) extending parallel to a workpiece spindle axis (11) of the machine tool which also includes a workpiece handling device (2) with a workpiece gripper movable only in a vertical plane parallel to the workpiece spindle axis, the device comprising tool grippers (21, 22) interchangeably insertable in the workpiece handling device (2), said cross slides (40, 41) each including a plan carriage (38, 39), at least one tool receiver of each tool turret head being movable to various operative positions in a plane of movement of said tool grippers by a respective plan carriage of a respective cross slide, means for moving tools (27, 28) being interchanged to a preparation position for said grippers (21, 22) which place the tools into said tool receivers to be clamped in a respective cutting position, and tool holders (43, 44, 45) to be clamped by said tool grippers and received in tool receivers, each tool having gripping fingers (46, 47, 48, 49) which have grippping surfaces, each tool holder of the tool being interchanged having two clamping faces (51, 52; 53, 54; 55, 56) corresponding to said gripping surfaces of each gripping finger, two said clamping faces being offset relative to each other by an angle which corresponds to a different operative angle of the tool receiver (42) positioned in an exchange position whereby each tool holder can be held by a respective tool gripper in two different rotation positions.

2. The device as defined in claim 1, wherein each tool gripper has two clamping fingers (46, 47, 48, 49) each havint V-shaped gripping surfaces (57,58), wherein one of said gripping surfaces (57) is linear and the other of said gripping surfaces (58) is curved.

3. The device as defined in claim 2, wherein one of said clamping fingers (47, 49) is stationary and the other of said clamping fingers (46, 48) is displaceable, wherein the linear gripping surface is provided on said stationary gripping finger and is inclined to a vertical at a small angle.

4. The device as defined in claim 1, wherein said means for moving tools being interchanged to a preparation position include a tool magazine in which one of said tools (27) is arranged in a first cutting position and the other of said tools (28) is arranged in a second cutting position.

5. The device as defined in claim 1, wherein one tool magazine for a preparation position is provided for receiving a tool being interchanged in a first cutting position for a tool exchange in a first tool turret head, and a second tool magazine is provided for receiving a tool being interchanged in a second cutting position for a tool exchange in a second tool turret head.

* * * * *